(12) United States Patent
Ota

(10) Patent No.: US 8,144,256 B2
(45) Date of Patent: Mar. 27, 2012

(54) VIDEO SIGNAL TRANSMISSION UNIT

(75) Inventor: Kazuo Ota, Kanagawa (JP)

(73) Assignee: Panasonic Corporation, Osaka (JP)

( * ) Notice: Subject to any disclaimer, the term of this patent is extended or adjusted under 35 U.S.C. 154(b) by 1026 days.

(21) Appl. No.: 11/996,321

(22) PCT Filed: Oct. 4, 2006

(86) PCT No.: PCT/JP2006/319894
§ 371 (c)(1),
(2), (4) Date: Jan. 21, 2008

(87) PCT Pub. No.: WO2007/040251
PCT Pub. Date: Apr. 12, 2007

(65) Prior Publication Data
US 2009/0102978 A1     Apr. 23, 2009

(30) Foreign Application Priority Data
Oct. 5, 2005    (JP) .................................. 2005-292503

(51) Int. Cl.
*H04N 5/268*          (2006.01)

(52) U.S. Cl. ............ 348/705; 348/11; 348/14; 348/153; 348/159; 348/706; 710/8; 710/9; 710/10; 710/11; 710/12

(58) Field of Classification Search .................. 348/705, 348/706, 153, 159, 11, 14; 710/8–18
See application file for complete search history.

(56) References Cited

U.S. PATENT DOCUMENTS

| 5,144,445 A |   | 9/1992 | Higashitsutsumi |
|---|---|---|---|
| 5,805,073 A | * | 9/1998 | Nagano et al. ................ 340/3.53 |
| 6,144,633 A | * | 11/2000 | Ikeda et al. .................... 370/217 |

FOREIGN PATENT DOCUMENTS

| JP | 06-197344 | 7/1994 |
|---|---|---|
| JP | 07-154673 | 6/1995 |
| JP | 09-294258 | 11/1997 |
| JP | 2000-020042 | 1/2000 |
| JP | 2001251609 A | 9/2001 |
| JP | 2002-232747 | 8/2002 |
| JP | 2005268882 A | 9/2005 |
| WO | 02093926 A1 | 11/2002 |
| WO | 03009599 A1 | 1/2003 |

OTHER PUBLICATIONS

International Search Report Dated Jan. 9, 2007.
European Search Report PCT/JP2006319894, dated Oct. 7, 2010.

\* cited by examiner

*Primary Examiner* — Joseph P. Hirl
*Assistant Examiner* — Jivka Rabovianski
(74) *Attorney, Agent, or Firm* — Pearne & Gordon LLP

(57) ABSTRACT

A repeater unit includes an input circuit having an input terminal that can be connected to output of an upstream repeater unit through a signal cable for inputting a video signal from the input terminal; an output circuit having an output terminal that can be connected to input of a downstream repeater unit through a signal cable for outputting a video signal to the output terminal; and a selection circuit that can be connected to a video signal output device for outputting a video signal and outputs the video signal input from the video signal output device to the output circuit. The input circuit and the output circuit have termination resistors matched with each other. When the repeater units are daisy-chained, termination matching is conducted.

3 Claims, 3 Drawing Sheets

VIDEO SIGNAL TRANSMISSION UNIT

TECHNICAL FIELD

This invention relates to a video signal transmission unit for transmitting a video signal.

BACKGROUND ART

A video display system that can supply a video signal to all of display units which are daisy-chained is available. The display units are thus daisy-chained, whereby to extend the system, an additional unit needs only to be connected to the chained last-stage unit and easy system expansion is made possible (for example, refer to patent document 1).

Patent document 1: JP-A-2000-20042

DISCLOSURE OF THE INVENTION

Problems to be Solved by the Invention

By the way, in a system of selecting and outputting one of video signals input from a plurality of video output units, preferably the video output units are daisy-chained and the selected signal is output in the point of having flexibility for add a selectable video output unit.

However, to daisy-chain the video output units for transmitting a video signal, in each video output unit, a branch connected to an upstream video output unit exists in a path for transmitting a video signal of the video output unit to a downstream video output unit and thus reflection of a signal caused by the branch, etc., occurs.

The invention is embodied considering the circumstances described above and it is an object of the invention to provide a video signal transmission unit that can provide easy expandability and can ensure the quality of a video signal to be transmitted.

Means For Solving the Problems

According to a first aspect of the invention, there is provided a video signal transmission unit including a daisy-chained input circuit having an input terminal that can be connected to output of a first video signal transmission unit through a signal cable for inputting a video signal from the input terminal; a daisy-chained output circuit having an output terminal that can be connected to input of a second video signal transmission unit through a signal cable for outputting a video signal to the output terminal; and a video input circuit that can be connected to a video signal output device for outputting a video signal and outputs the video signal input from the video signal output device to the daisy-chained output circuit, wherein the daisy-chained input circuit and the daisy-chained output circuit have termination parts matched with each other.

According to the configuration, if a plurality of video signal transmission units are daisy-chained, termination matching is conducted and degradation of a video signal caused by reflection of the video signal, etc., can be prevented, so that easy expandability can be provided and the quality of the video signal to be transmitted can be ensured.

As a second aspect of the invention, in the video signal transmission unit described above in the first aspect, the daisy-chained input circuit and the daisy-chained output circuit are implemented as a DC coupling circuit.

According to the configuration, disorder of synchronism caused by bias fluctuation at the switching time in AC coupling does not occur, so that the synchronous signal at the switching time of the video signal transmission unit can be stabilized.

As a third aspect of the invention, in the video signal transmission unit described above in the first or second aspect, the video input circuit has a clamp circuit for clamping the reference level of the video signal input from the video signal output device to a predetermined level.

According to the configuration, the reference level of the video signal is clamped to the predetermined level. Thus, when a plurality of video signal transmission units are daisy-chained, if switching to a video signal from a different video signal transmission unit is performed, the quality of the video signal can also be ensured.

As a fourth aspect of the invention, in the video signal transmission unit described above in the first or second aspect, the video input circuit has a switch section for switching between a connection state and a non-connection state between the video signal output device and the daisy-chained output circuit and a first output transistor connected to output of the switch section and if the video signal output device and the daisy-chained output circuit are in the non-connection state, the switch section applies 0 bias to the first output transistor.

According to the configuration, if video signal input is not active, the video input circuit is not connected to the video signal transmission path from the video signal transmission unit connected upstream to the video signal transmission unit connected downstream, so that the effect on the video signal transmission can be prevented.

As a fifth aspect of the invention, in the video signal transmission unit described above in the fourth aspect, the video input circuit can be connected to a plurality of video signal output devices and further includes a plurality of clamp circuits for clamping the reference levels of the video signals input from the plurality of video signal output devices to the same level, and the switch section selects one of the video signals input through the clamp circuits as the connection state.

According to the configuration, video signals from the video output devices can be switched in one signal transmission unit and the reference levels of all video signals are clamped to a predetermined level, so that if switching to a video signal from a different video output device is performed by the switch section, the quality of the video signal can also be ensured.

As a sixth aspect of the invention, in the video signal transmission unit described above in the fourth or fifth aspect, the daisy-chained input circuit has a second output transistor which is turned off according to a 0-bias signal input from the first video signal transmission unit.

According to the configuration, to transmit a video signal from the video signal input of the video signal transmission unit to the video signal transmission unit connected downstream, the daisy-chained input circuit is not connected to the video signal transmission path, so that the effect on the video signal transmission can be prevented.

Advantages of The Invention

According to the invention, there can be provided a video signal transmission unit that can provide easy expandability and can ensure the quality of the video signal to be transmitted.

Figure 1:
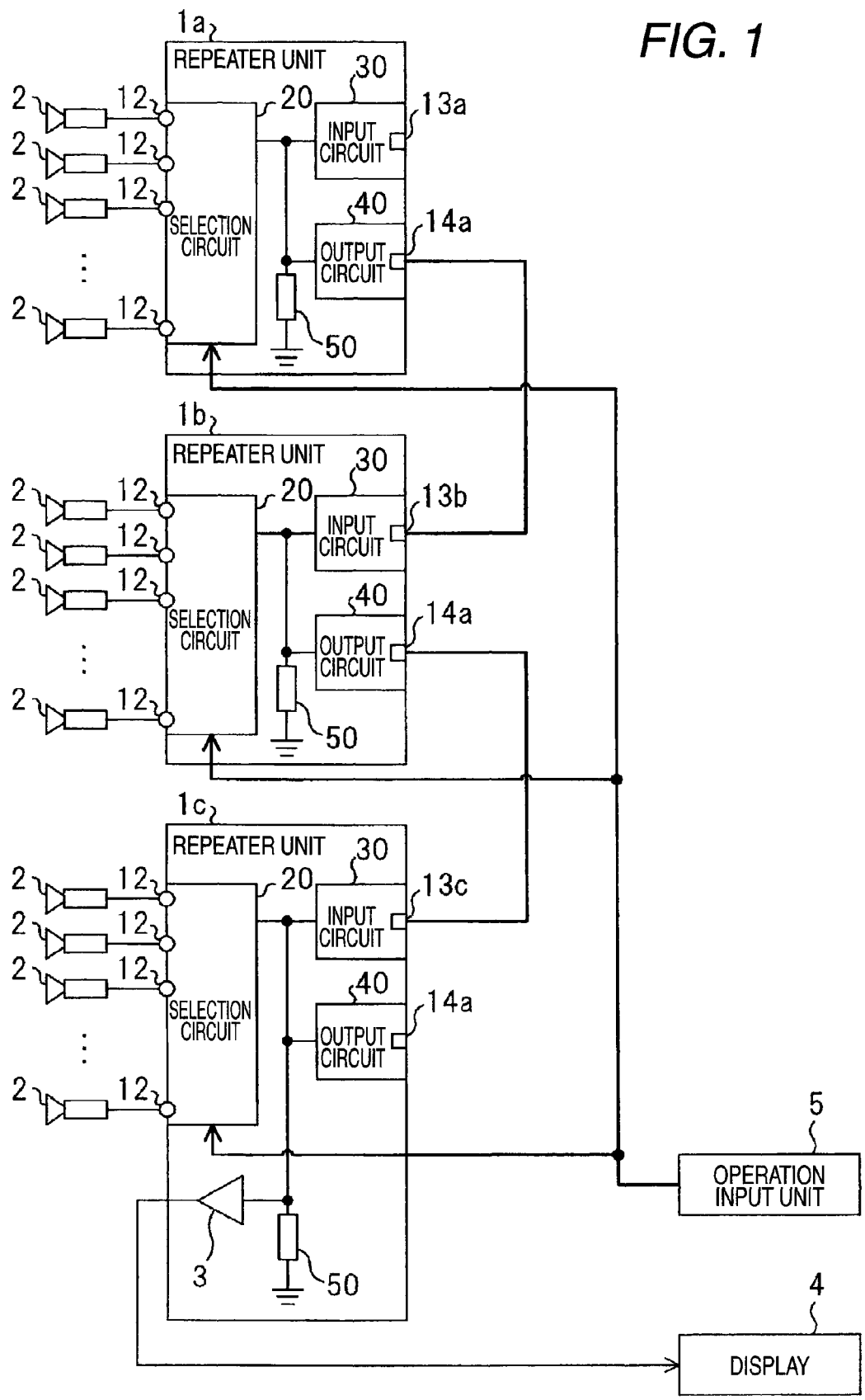
FIG. 1 is a block diagram to show the schematic configuration of a video signal transmission system according to the embodiment of the invention.

DESCRIPTION OF REFERENCE NUMERALS 1, 1a, 1b, 1c Repeater unit
2 Camera
3 Buffer circuit
4 Operation input unit
5 Display
12 Device input terminal
13, 13a, 13b, 13c Daisy input terminal
14, 14a, 14b, 14c Daisy output terminal
20 Selection circuit
21 Clamp circuit
30 Input circuit
40 Output circuit

BEST MODE FOR CARRYING OUT THE INVENTION

An embodiment of the invention will be discussed with reference to the accompanying drawings. FIG. 1 is a block diagram to show the schematic configuration of a video signal transmission system according to the embodiment of the invention. In the embodiment, a repeater unit 1 that can select one of video signal inputs and can transmit a signal from another repeater unit will be discussed as an example of a video transmission unit for transmitting a video signal from a video output device for outputting a video signal, such as a camera.

As shown in FIG. 1, in the video signal transmission system of the embodiment, repeater units 1a, 1b, and 1c are wired by signal cables in a drawing manner with one stroke. In the system, for example, 256 video signals are input to device input terminals 12 of the three divided repeater units 1a, 1b, and 1c and any one video signal is selected and transmitted by the repeater units 1a, 1b, and 1c based on a command input to an operation input unit 5. The transmitted selected video signal is output to and displayed on a display 4, for example.

In the embodiment, a camera 2 will be discussed as an example of a video output device for outputting a video signal to the repeater unit 1. Each of the repeater units 1a to 1c has 96 device input terminals 12; video signals of first to 96th cameras 2 are input to the repeater unit 1c, video signals of 97th to 192nd cameras 2 are input to the repeater unit 1b, and video signals of 193rd to 256th cameras 2 are input to the repeater unit 1c.

Each of the repeater units 1a, 1b, and 1c has a daisy input terminal 13 that can be connected to output of an upstream repeater unit through a signal cable, an input circuit 30 to which video from the daisy input terminal 13 is input, a daisy output terminal 14 that can be connected to input of a downstream repeater unit through a signal cable, an output circuit 40 for outputting a video signal to the daisy output terminal, and a selection circuit 20 for outputting a video signal input from a video signal output device to the output circuit 40. The selection circuit 20 has a plurality of device input terminals 12 through which a plurality video signals can be input, and selects a video signal in accordance with an operation input signal from the operation input unit 5. The symbols of the daisy input terminals and the daisy output terminals in the repeater units 1a, 1b, and 1c are daisy input terminals 13a, 13b, and 13c and daisy output terminals 14a, 14b, and 14c. The repeater units 1a, 1b, and 1c are the same in the configurations of the device input terminals 12, the daisy input terminals 13, the daisy output terminals 14, the selection circuits 20, the input circuit 30, and the output circuits 40.

The repeater units 1 are connected to each other by connecting a signal cable from the daisy output terminal 14 to the daisy input terminal 13. As shown in FIG. 1, the daisy input terminal 13b of the repeater unit 1b is connected from the daisy output terminal 14a of the repeater unit 1a in order from the upstream side, whereby the repeater units 1a and 1b are connected. The daisy input terminal 13c of the repeater unit 1c is connected from the daisy output terminal 14b of the repeater unit 1b, whereby the repeater units 1b and 1c are connected.

In the system, one video signal is selected from 256 video signal inputs and thus in each of the repeater units 1a, 1b, and 1c, selection output of the selection circuit 20 where selection is not active is not connected to the daisy input terminal 13 or the daisy output terminal 14 and a signal of the selection circuit 20 where selection is active is not returned to the daisy input terminal 13.

A video signal of the final selection output is directly output via a buffer circuit 3 from between the daisy input terminal 13c and the daisy output terminal 14c of the repeater unit 1c connected most downstream, a common selection signal line to all input signals. The buffer 3 is described as a circuit required as a signal route if some treatment is added to a selection output signal, for example, text display is produced. However, if selection processing from the 256 video signal inputs needs only to be performed, the selected video signal may be output from the output terminal 14c of the output circuit 40 and therefore the repeater units 1a to 1c may have the same configuration.

Figure 2:
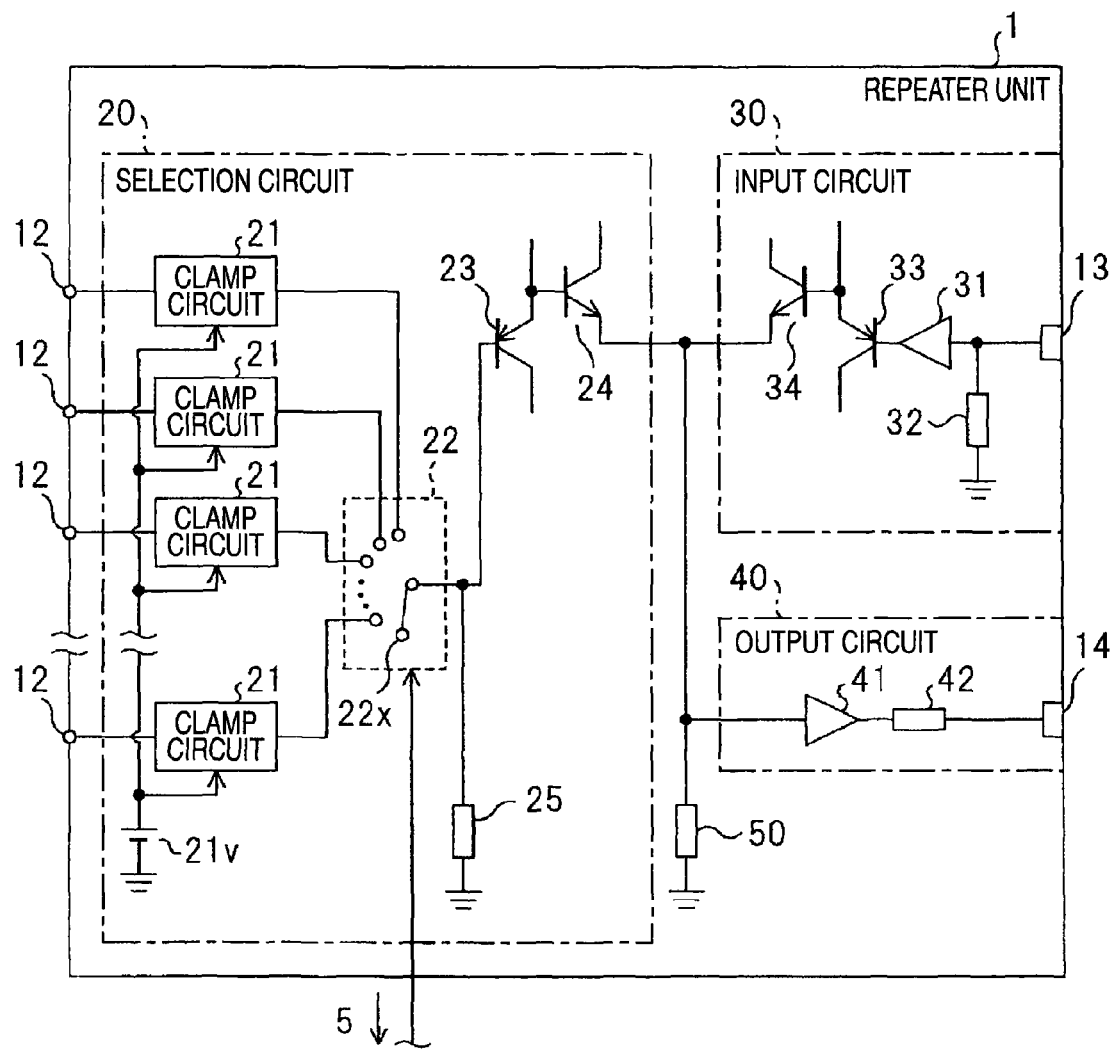
FIG. 2 is a diagram to show the schematic configuration of a video signal transmission unit according to the embodiment of the invention.

FIG. 2 is a diagram to show the schematic configuration of the video signal transmission unit according to the embodiment of the invention. As shown in FIG. 2, the selection circuit 20 can be connected to the cameras 2 through the 96 device input terminals 12, for example. It has clamp circuits 21 connected in a one-to-one correspondence with the device input terminals 12, a switch section 22 for switching between a connection state and a non-connection state between one of video signals input through the clamp circuits 12 and the output circuit 40 based on an operation command from the operation input unit 5, a PNP transistor 23 and an NPN transistor 24 provided on the output side of the switch section 22, and a ground resistor 25.

A common power supply voltage 21 v is applied to the clamp circuits 21 and the reference level of a bottom level, a pedestal level, etc., of a synchronous signal is clamped to the same level in the video signals input from the cameras 2, whereby stable synchronizing separation can be executed.

Figure 3:
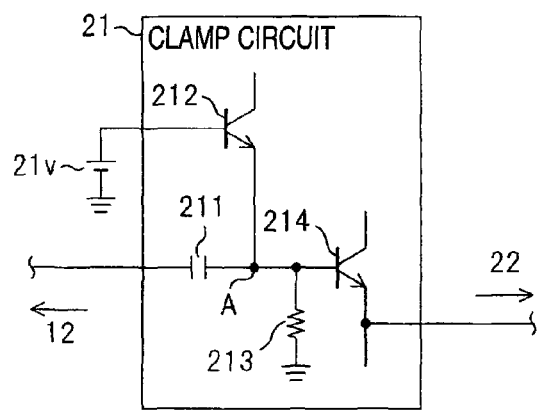
FIG. 3 is a diagram to show the internal configuration of a clamp circuit in the video signal transmission unit according to the embodiment of the invention.

The clamp circuit 21 will be discussed with FIG. 3. FIG. 3 is a diagram to show the internal configuration of the clamp circuit in the video signal transmission unit according to the embodiment of the invention. The clamp circuit 21 includes a DC coupling capacitor 211 connected to the device input terminal 12, an NPN transistor 212 having a base to which the power supply voltage 21 v is connected and an emitter connected to a connection point A on the output side of the DC coupling capacitor 211, a ground resistor 213 connected to output of the DC coupling capacitor 211, and an NPN transistor 214 of an output transistor having a base connected to the output of the DC coupling capacitor 211. In the invention, power supply voltage 21 v=1.7[V].

An input signal is converted into an AC component through the DC coupling capacitor 211 input from the device input terminal 12. When the clamp voltage of the connection point A becomes lower than 1.0[V], base-emitter voltage VBE of the NPN transistor 212 becomes large (VBE>0.7[V]) and the NPN transistor 212 is turned on. A current is supplied from the NPN transistor 212 and the DC coupling capacitor 211 is charged. As it is charged, the potential of the connection point A rises and the capacitor is charged until the minimum value of the input signal becomes 1.0[V] or more.

When the potential of the connection point A becomes or more, the base-emitter voltage VBE of the NPN transistor 212 becomes small (VBE<0.7 [V]), the NPN transistor 212 is turned off, and charging the capacitor is stopped. At this time, the minimum value of the input signal becomes a potential equal to the clamp voltage. That is, for example, for a composite video signal, the minimum value of a synchronous signal is fixed.

Next, if the capacitor is discharged by the base current of the NPN transistor 214 and the ground resistor 213, again the clamp potential of the connection point A lowers and the base-emitter voltage VBE of the NPN transistor 212 becomes large (VBE>0.7 [V]). Then, the NPN transistor 212 is turned on and thus a current is supplied from the NPN transistor 212, the DC coupling capacitor 211 is charged, and the minimum value of the input signal rises to a voltage for turning off the NPN transistor 212 (1.0[V] or more). Thus, charge and discharge are repeated so that the clamp voltage and the minimum value of the input signal are kept equal.

The switch section 22 has a configuration wherein open 22x can be selected in addition to input from each clamp circuit 12. Output of the switch section 22 is connected to a base of the PNP transistor 23 and an emitter of the PNP transistor 23 is connected to a base of the NPN transistor 24. An emitter of the NPN transistor 24 becomes output of the selection circuit. The ground resistor 25 is connected at one end to a connection point between the switch section 22 and the PNP transistor 23 and is grounded at an opposite end.

The input circuit 30 has a 0 dB buffer 31 connected to the daisy input terminal 13, a termination resistor 32 connected at one end to a connection point between the daisy input terminal 13 and the 0 dB buffer 31 and grounded at an opposite end, a PNP transistor 33, and an NPN transistor 34. A base of the PNP transistor 33 is connected to output of the 0 dB buffer 31 and a base of the NPN transistor 34 is connected to an emitter of the PNP transistor 33.

The output circuit 40 has a 6 dB driver 41 connected to a connection point between output 20 of the selection circuit and output of the input circuit 30 and a connection point to a termination resistor 50 and a termination resistor 42 connected in series between the 6 dB driver 41 and the daisy output terminal 14.

Next, the operation of the repeater unit 1 described above will be discussed. The case where video output from one of the cameras 2 connected to the repeater unit 1b is selected as output of the video transmission system will be discussed below:

Since the selection circuit 20 of the repeater unit 1a does not select a video signal input to the device input terminal 12, the switch section 22 is set to open 22x. Therefore, the base of the transistor 23 becomes 0 bias through the ground resistor 25 and thus the transistor 24 is cut off. Therefore, the output circuit 40 of the repeater unit 1a transmits a bias DC component to the daisy output terminal 14.

The input circuit 30 of the repeater unit 1b connected to the next stage to the repeater unit 1a is connected to the output circuit 40 of the repeater unit 1a and thus enters a 0 bias state and the transistor 34 is turned off. Therefore, the circuit upstream from the input circuit 30 is not connected to the transistor 24 of the selection circuit 20 of the repeater unit 1b.

Since one of video inputs is selected in the repeater unit 1b, the switch section 22 of the selection circuit 20 places the selected device input terminal 12 in a connection state. In output of the switch section 22, a signal having one bias is obtained by the clamp circuit 21 connected to the selected device input terminal 12 and thus the transistor 24 is turned on. The transistor 34 of the input circuit 30 is off and is not connected to the transistor 24 as described above and thus selected video output appears in the daisy output terminal 14b through the output circuit 40.

The input circuit 30 of the repeater unit 1c connected to the next stage to the repeater unit 1b is connected to the output circuit 40 of the repeater unit 1b. The output circuit 42 is provided with the termination resistor 42 and the input circuit 30 is provided with the termination resistor 32. The termination resistors provide a termination function and are matched with each other, whereby reflection caused by the signal cable connecting the devices, etc., can be minimized and a preferred condition as image transmission can be provided.

Since the selection circuit 20 of the repeater unit 1c does not select a video signal input to the device input terminal 12, the switch section 22 is set to open 22x. Therefore, the base of the transistor 23 becomes 0 bias through the ground resistor 25 and thus the transistor 24 is cut off. Therefore, the selection circuit 20 is not connected to the transistor 34 of the input circuit and thus the signal input from the daisy input terminal 13c passes through the input circuit 30 and is output from the buffer circuit 3.

The repeater unit is provided with the input circuit 30 and the output circuit 40 dedicated to the daisy-chaining purpose, which have the termination parts matched with each other as described above, so that it is made possible to suppress reflection in the connected signal cable, etc. The biases of the output transistors of the selection circuit 20 and the input circuit 30 are set to 0 in a state in which a video signal is not input. Thus, it is made possible to transfer a signal having directivity between the daisy-chained repeater units.

Figure 4:
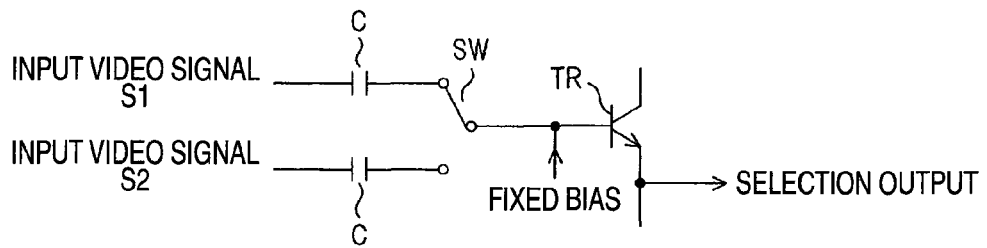
FIG. 4 is a drawing to show a video signal switch circuit based on AC coupling.
Figure 5:
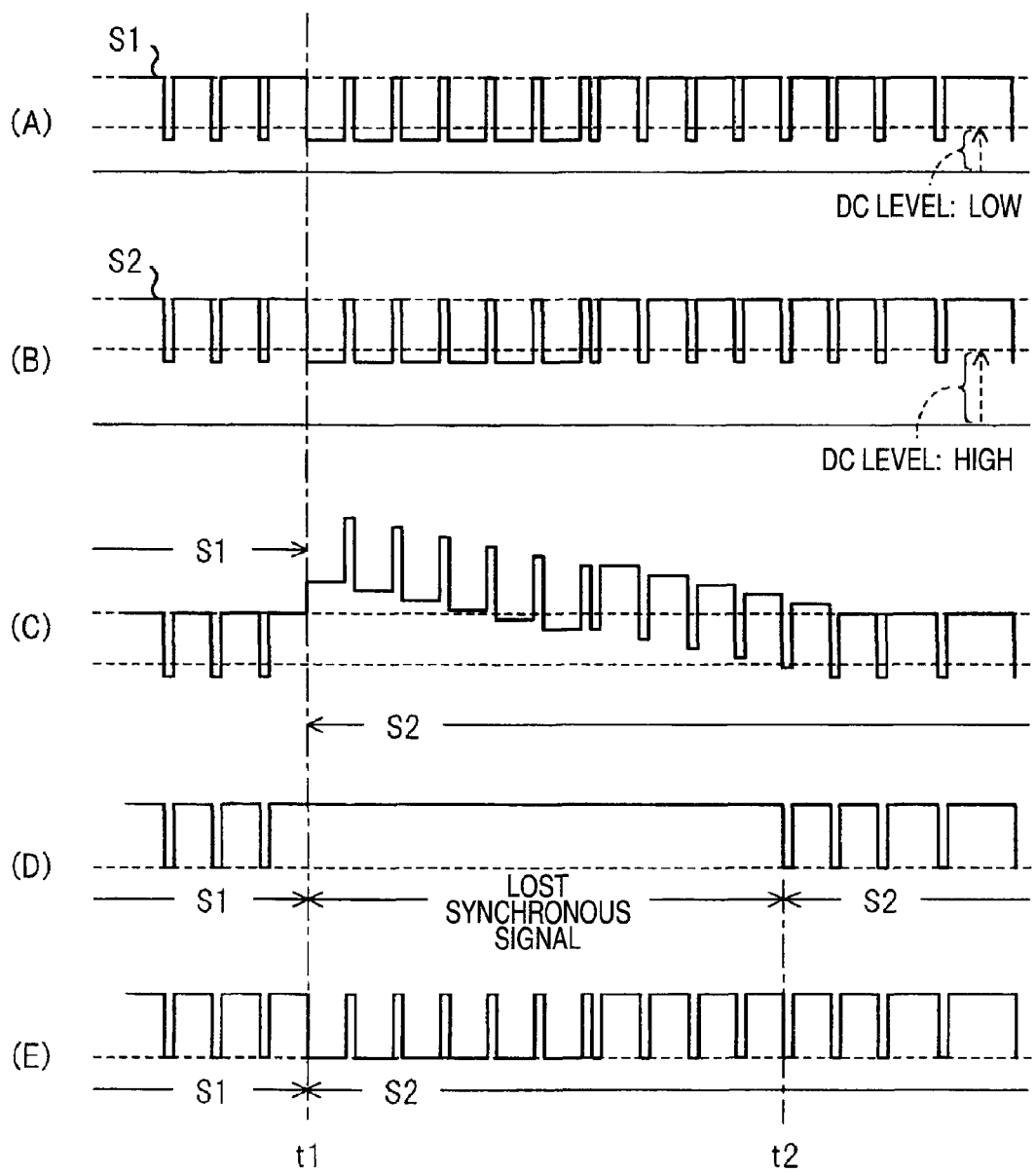
FIG. 5 is a drawing to describe video signal change at the video input switching time based on AC coupling.

In each of the repeater units of the embodiment, the input circuit 30 and the output circuit 40 are implemented as a DC coupling circuit so that DC transmission can be executed between the upstream and downstream repeater units. The advantages provided by using the DC coupling circuit will be discussed below with FIGS. 4 and 5:

FIG. 4 is a drawing to show a video signal switch circuit based on AC coupling, and FIG. 5 is a drawing to describe video signal change at the video input switching time based on AC coupling. FIG. 5 (A) is a drawing to show a signal waveform of an input video signal S1, FIG. 5 (B) is a drawing to show a signal waveform of an input video signal S2, FIG. 5 (C) is a drawing to show a signal waveform when the input video signal is switched from S1 to S2, FIG. 5 (D) is a drawing to show a synchronous signal separated when the input video signal is switched from S1 to S2, and FIG. 5 (E) is a drawing to show a normally separated synchronous signal.

The case where any one of the input video signals S1 and S2 is selected and is output as shown in FIGS. 4 and 5 will be discussed. Each of the input video signals S1 and S2 is ac-transmitted using a capacitor C and either of the signals is selected in a switch SW. Output of the switch SW is connected to a base of a transistor TR. A fixed bias is applied to the base of the transistor TR.

When the input video signals S1 and S2 have different DC levels, namely, when the DC level of the input video signal S1 is low as shown in FIG. 5 (A) and the DC level of the input video signal S2 is high as shown in FIG. 5 (B), if the input video signal is switched from S1 to S2 through the switch SW at time t1 as shown in FIG. 5 (C), the selected signal passes through the capacitor C and is output as it is. The DC level of the input video signal S2 after the switching converges by discharge of a bias circuit, etc., with the passage of time.

In this case, a synchronous signal is not normally separated and is lost between time t1 and time t2, whereby display output on the display becomes unstable.

Then, in the embodiment, the clamp circuit 21 is provided so that the reference level of sink chip voltage, etc., between the video signals to be selected becomes the same level as described above, so that the DC level of the video input signal at the selecting time does not change if the signal is switched in the repeater unit 1.

The repeater units 1 containing the clamp circuits 21 for clamping to the reference level and capable of executing DC transmission are daisy-chained with the DC potential of a synchronous signal fixed. Therefore, if switching to a video signal input to a different repeater unit 1 is performed, the DC potential of the synchronous signal does not change, so that loss of detection in synchronizing separation from the video signal does not exist and stable image display is provided.

According to the embodiment of the invention, there can be provided an easy-to-handle system having high system performance and expandability wherein ideal transmission and matching state are realized between the output circuit and the input circuit daisy-chained, the cables connecting the devices are minimized, and a plurality of video output devices can be daisy-chained. The video transmission units have the clamp circuits for setting input video signals from video output devices to the mutually equal clamp voltage and are daisy-chained using the circuits capable of executing DC transmission between the video transmission units, whereby stable video input switching can be performed.

In the embodiment, the repeater unit that can select a video signal from a plurality of video output devices has been described as the video transmission unit, but it may be a unit that can input a signal only from one video output device.

While the invention has been described in detail with reference to the specific embodiments, it will be obvious to those skilled in the art that various changes and modifications can be made without departing from the spirit and the scope of the invention.

This application is based on Japanese Patent Application No. 2005-292503 filed on Oct. 5, 2005, which is incorporated herein by reference.

INDUSTRIAL APPLICABILITY

The video signal transmission unit of the invention has the advantages that it can provide easy expandability and can ensure the quality of the video signal to be transmitted, and is useful for a video signal transmission system for selecting one video from among video signal inputs and transmitting the video and the like.

The invention claimed is:

1. A video signal transmission unit comprising:
a daisy-chained input circuit including an input terminal that can be connected to an output of a first video signal transmission unit through a signal cable for inputting a video signal from the input terminal;
a daisy-chained output circuit including an output terminal that can be connected to an input of a second video signal transmission unit through a signal cable for outputting a video signal to the output terminal; and
a video input circuit that can be connected to a video signal output device for outputting a video signal and outputs the video signal input from the video signal output device to the daisy-chained output circuit,
wherein the daisy-chained input circuit and the daisy-chained output circuit are implemented as a DC coupling circuit,
wherein the video input circuit includes a switch section for switching between a connection state and a non-connection state between the video signal output device and the daisy-chained output circuit and a first output transistor connected to output of the switch section,
wherein, if the video signal output device and the daisy-chained output circuit are in the non-connection state, the switch section applies 0bias to the first output transistor and the first output transistor is cut off, and if the video signal output device and the daisy-chained output circuit are in the connection state, the first output transistor is turned on by the bias of the output signal of the video signal output device and the signal of the video signal output device is output from the daisy-chained output circuit, and
wherein the daisy-chained input circuit includes a second output transistor which is turned off if the video signal is not input from the first video signal transmission unit, and turned on by the bias of the video signal if the video signal is input from the first video signal transmission unit.

2. The video signal transmission unit according to claim 1, wherein the video input circuit includes a clamp circuit for clamping a reference level of the video signal input from the video signal output device to a predetermined level.

3. A video signal transmission system including a plurality of video signal transmission units according to claim 1, comprising:
an operation input unit for controlling switch sections of the plurality of video signal transmission units and selecting one of the plurality of video signal transmission units.

* * * * *

UNITED STATES PATENT AND TRADEMARK OFFICE
CERTIFICATE OF CORRECTION

PATENT NO. : 8,144,256 B2  
APPLICATION NO. : 11/996321  
DATED : March 27, 2012  
INVENTOR(S) : Kazuo Ota Page 1 of 1

It is certified that error appears in the above-identified patent and that said Letters Patent is hereby corrected as shown below:

In column 5, line 13, insert --1.0 [V]-- between "becomes" and "or"

Signed and Sealed this  
Twenty-eighth Day of August, 2012

David J. Kappos  
*Director of the United States Patent and Trademark Office*